United States Patent
Bollay (10) Patent No.: US 8,806,053 B1
(45) Date of Patent: Aug. 12, 2014

(54) METHODS AND SYSTEMS FOR OPTIMIZING NETWORK TRAFFIC USING PREEMPTIVE ACKNOWLEDGMENT SIGNALS

(75) Inventor: Benn Bollay, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 19 days.

(21) Appl. No.: 12/111,517

(22) Filed: Apr. 29, 2008

(51) Int. Cl.
*G06F 15/16* (2006.01)

(52) U.S. Cl.
USPC .......................................................... 709/232

(58) Field of Classification Search
USPC .......................................................... 709/232
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A * | 1/1990 | Chang et al. .................. 707/201 |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |

(Continued)

FOREIGN PATENT DOCUMENTS

| | | |
|---|---|---|
| EP | 0744850 A2 | 11/1996 |
| WO | 9114326 | 9/1991 |

(Continued)

OTHER PUBLICATIONS

Crescendo Networks, "Application Layer Processing (ALP)," 2003-2009, pp. 168-186, Chapter 9, CN-5000E/5500E, Foxit Software Company.

(Continued)

*Primary Examiner* — Ryan Jakovac
(74) *Attorney, Agent, or Firm* — LeClairRyan, a Professional Corporation (57) ABSTRACT

Methods and systems for efficient transmission of data between a requesting computer and a server. A request is received for server data from a requesting computer and the request is sent to the server over at least one network. The requested server data responsive to the request is forwarded on to the requesting computer. It is determined whether the requested server data has been previously forwarded either to the requesting computer or at least one other requesting computer. A preemptive acknowledgement signal is sent to the transmitting server substantially upon determining the requested server data has been previously forwarded for causing the transmitting server to cease transmitting any remaining, un-transmitted portions of the requested server data. These methods and systems increase the efficiency of transmission resources in a network.

12 Claims, 4 Drawing Sheets

(56) References Cited

U.S. PATENT DOCUMENTS

| | | | |
|---|---|---|---|
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A * | 8/1999 | Pitts ............................. 707/10 |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A * | 11/1999 | McLaughlin et al. ............ 700/9 |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 * | 9/2001 | Harrington et al. ............ 370/389 |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,283,470 B1 | 10/2007 | Sindhu et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,668,166 B1 | 2/2010 | Rekhter et al. |
| 7,706,261 B2 | 4/2010 | Sun et al. |
| 7,724,657 B2 | 5/2010 | Rao et al. |
| 7,801,978 B1 | 9/2010 | Susai et al. |
| 7,876,677 B2 | 1/2011 | Cheshire |
| 7,908,314 B2 | 3/2011 | Yamaguchi et al. |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,380,854 B2 | 2/2013 | Szabo |
| 8,447,871 B1 | 5/2013 | Szabo |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 * | 10/2002 | Gonzalez et al. ............. 709/233 |
| 2002/0198993 A1 * | 12/2002 | Cudd et al. .................... 709/225 |
| 2003/0046291 A1 | 3/2003 | Fascenda |
| 2003/0070069 A1 | 4/2003 | Belapurkar et al. |
| 2003/0086415 A1 * | 5/2003 | Bernhard et al. ............. 370/352 |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 * | 12/2003 | Fritz et al. ........................ 701/1 |
| 2004/0003287 A1 | 1/2004 | Zissimopoulos et al. |
| 2004/0103283 A1 | 5/2004 | Hornak |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0122977 A1 * | 6/2005 | Lieberman ................... 370/394 |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0262238 A1 | 11/2005 | Reeves et al. |
| 2006/0031520 A1 | 2/2006 | Bedekar et al. |
| 2006/0059267 A1 * | 3/2006 | Cugi et al. ..................... 709/230 |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1 | 3/2007 | Sood et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0174491 A1 | 7/2007 | Still et al. |

(56) References Cited

U.S. PATENT DOCUMENTS

| | | |
|---|---|---|
| 2007/0220598 A1 | 9/2007 | Salowey et al. |
| 2007/0297551 A1 | 12/2007 | Choi |
| 2008/0034136 A1 | 2/2008 | Ulenas |
| 2008/0072303 A1 | 3/2008 | Syed |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0256224 A1 | 10/2008 | Kaji et al. |
| 2008/0301760 A1 | 12/2008 | Lim |
| 2009/0028337 A1 | 1/2009 | Balabine et al. |
| 2009/0049230 A1 | 2/2009 | Pandya |
| 2009/0119504 A1 | 5/2009 | van Os et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0228956 A1 | 9/2009 | He et al. |
| 2009/0287935 A1 | 11/2009 | Aull et al. |
| 2010/0023582 A1 | 1/2010 | Pedersen et al. |
| 2010/0071048 A1 | 3/2010 | Novak et al. |
| 2010/0122091 A1 | 5/2010 | Huang et al. |
| 2010/0150154 A1 | 6/2010 | Viger et al. |
| 2010/0242092 A1 | 9/2010 | Harris et al. |
| 2010/0251330 A1 | 9/2010 | Kroeselberg et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0173295 A1 | 7/2011 | Bakke et al. |
| 2011/0273984 A1 | 11/2011 | Hsu et al. |
| 2011/0282997 A1 | 11/2011 | Prince et al. |
| 2011/0321122 A1 | 12/2011 | Mwangi et al. |
| 2012/0066489 A1 | 3/2012 | Ozaki et al. |

FOREIGN PATENT DOCUMENTS

| | | |
|---|---|---|
| WO | 9505712 | 2/1995 |
| WO | 9905829 | 2/1997 |
| WO | 9709805 | 3/1997 |
| WO | 9745800 | 12/1997 |
| WO | 9906913 | 2/1999 |
| WO | 9910858 | 3/1999 |
| WO | 9939373 | 8/1999 |
| WO | 9964967 | 12/1999 |
| WO | 0004422 | 1/2000 |
| WO | 0004458 | 1/2000 |

OTHER PUBLICATIONS

"A Process for Selective Routing of Servlet Content to Transcoding Modules," Research Disclosure 422124, Jun. 1999, pp. 889-890, IBM Corporation.

"Big-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Fielding et al., "Hypertext Transfer Protocol—HTTP/1.1," Network Working Group, RFC: 2068, Jan. 1997, pp. 1-162

Fielding et al., "Hypertext Transfer Protocol—HTTP/1.1," Network Working Group, RFC: 2616, Jun. 1999, pp. 1-176.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Macvittie, Lori, "Message-Based Load Balancing," Technical Brief, Jan. 2010, pp. 1-9, F5 Networks, Inc.

F5 Networks Inc., "Configuration Guide for Local Traffic Management," F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report for International Patent Application No. PCT/US2013/026615 (Jul. 4, 2013).

* cited by examiner

METHODS AND SYSTEMS FOR OPTIMIZING NETWORK TRAFFIC USING PREEMPTIVE ACKNOWLEDGMENT SIGNALS

FIELD OF THE INVENTION

This invention generally relates to optimizing data transmission over a network and more particularly, to a method and systems for optimizing the transmission of data to streamline network performance via preemptive acknowledgement signals.

BACKGROUND

With the widespread use of network based applications and the advent of the need to transmit larger amounts of data in the form of video or audio files, concerns have been raised with straining network resources in the routine transfer of data between networked computers. Currently such requests may be made for data to a web based server via a normal http request. The data is sent with certain information such as checksums to confirm the receipt of all of the data intended to be sent. Once the entirety of the requested data is received, the receiving computer sends an acknowledgment signal to the sending computer.

However, certain data is sent repetitively such as audio or video files that may be used repeatedly by certain applications. Although the receiving computer may already have received the requested data, it continues to request the same data when running certain applications that will reuse the received data. Thus the receiving computer receives the same data thus using network transmission resources unnecessarily. The large amount of unnecessary data transmission creates bottlenecks in network systems therefore slowing down service and responses to other server requests. For example, visiting a website may result in sending a flash file to the client's browser which may be cached. After visiting another page, the user may return to the website and subsequently have to request the flash file again from the web server.

SUMMARY

According to one example, a method is disclosed for efficient transmission of data between a requesting computer and a server. A request is received for server data from a requesting computer and the request is sent to the server over at least one network. The requested server data responsive to the request is forwarded on to the requesting computer. It is determined whether the requested server data has been previously forwarded to the requesting computer or at least one other requestor. A preemptive acknowledgement signal is sent to the transmitting server substantially upon determining the requested server data has been previously forwarded for causing the transmitting server to cease transmitting any remaining, un-transmitted portions of the requested server data.

Another example disclosed is a machine readable medium having stored thereon instructions for increasing data flow in at least one network. The stored instructions comprise machine executable code, which when executed by at least one machine processor, causes the machine to accept a request for server data from a requesting computer over at least one network. The stored instructions further cause the machine to send the request for the server data to a server that stores the requested server data. The stored instructions further cause the machine to forward the requested server data responsive to the request to the requesting computer. The stored instructions further cause the machine to determine whether the requested server data has been previously forwarded to the requesting computer or at least one other requestor. The stored instructions further cause the machine to send a preemptive acknowledgement signal to the transmitting server substantially upon determining the requested server data has been previously forwarded for causing the transmitting server to cease transmitting any remaining, un-transmitted portions of the requested server data.

Another example disclosed is a system for efficient transmission of data. The system includes a requesting computer and a server coupled to the requesting computer via at least one network, the server storing server data. A network traffic optimization application module is interposed between the requesting computer and the server. The module receives a request for the server data from the requesting computer and sends the request to the server. The module forwards the requested server data responsive to the request on to the requesting computer. The module determines whether the requested server data has been previously forwarded either to the requesting computer or at least one other requesting computer. The module sends a preemptive acknowledgement signal to the transmitting server substantially upon determining the requested server data has been previously forwarded for causing the transmitting server to cease transmitting any remaining, un-transmitted portions of the requested server data.

Another example disclosed is a traffic management device for interposition between a requesting computer and a server. The traffic management device includes a first interface that receives a request for data from the requesting computer and sends the request to the server over a network. The device includes a second interface that obtains the requested data responsive to the request. A third interface forwards the requested data to the requesting computer. A controller determines whether the requested server data has been previously forwarded either to the requesting computer or at least one other requesting computer and sends a preemptive acknowledgement signal to the transmitting server substantially upon determining the requested server data has been previously forwarded for causing the transmitting server to cease transmitting any remaining, un-transmitted portions of the requested server data.

Additional aspects will be apparent to those of ordinary skill in the art in view of the detailed description of various embodiments, which is made with reference to the drawings, a brief description of which is provided below.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, the ability to terminate redundant data transmission from sending servers is limited because the acknowledgment signals indicating that data is received cannot be sent by the receiving computer until the entirety of the requested data has been received. The result is that data is sent to the receiving computer that made the request, despite the receiving computer already having the data, resulting in wasted transmission resources for sending data that is already available to the receiving computer.

Figure 1:
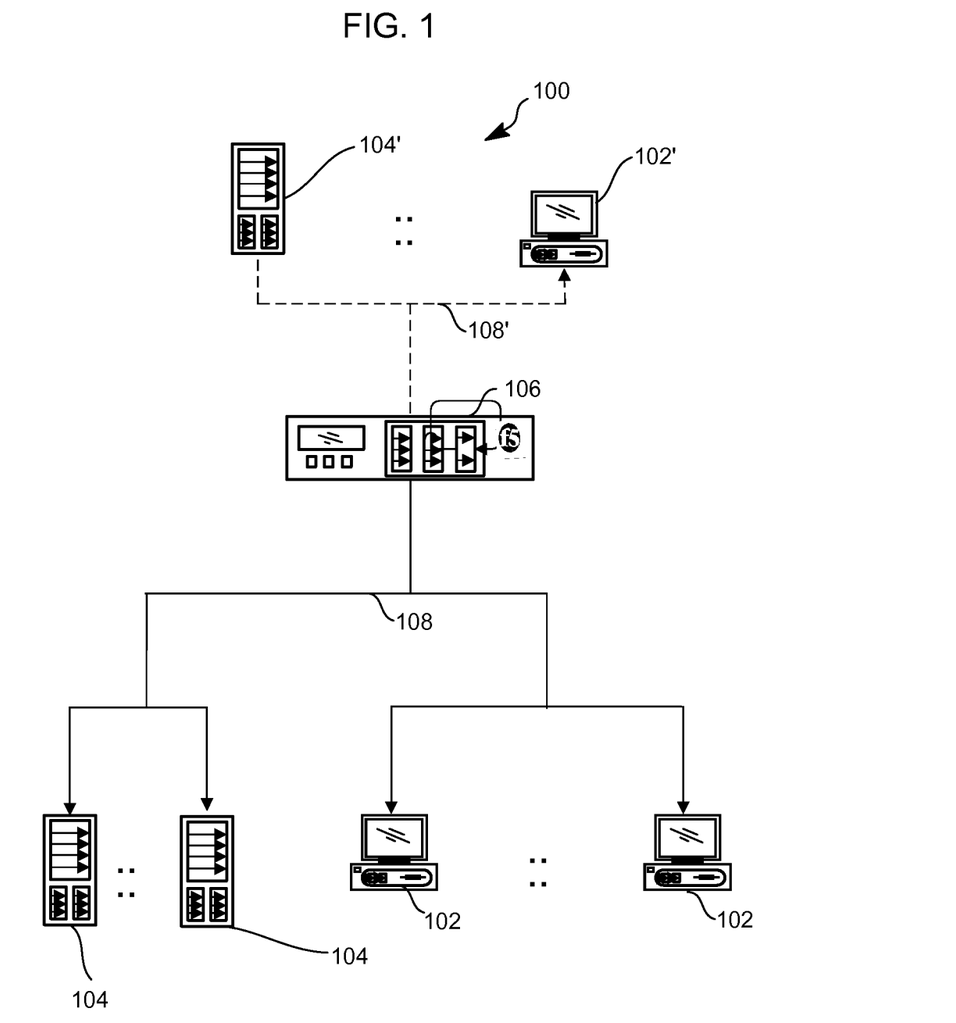
FIG. 1 is a block diagram of a network system using one example of an network traffic optimization application.

FIG. 1 is a block diagram of an example system 100 that may allow for efficient data transmission using deterministic acknowledgment signals from client computers in a network that employs a proxy device. The system 100 may provide responses and requests according to the HTTP based application protocol in this example, but the principles discussed herein are not limited to this example and can include other application and network protocols. The system 100 may include a series of one or more private client computers 102, one or more private servers 104, and at least one traffic management device 106. In this example, traffic management device 106 is logically interposed between the private client computers 102 and the private servers 104 in the private network 108, although other arrangements may be used in other network environments. The private client computers 102, in this example, may run web browsers, which may provide user interfaces allowing private computer 102 users to make data requests over private network 108 to different web server based applications operating on private servers 104, for instance, although the data requests can instead or in addition be made by public client computer 102' users in public network 108' to private servers 104 in the private network 108' and/or the data requests can instead or in addition be made by private client computer 102 users in private network 108 to public servers 104' in the public network 108'.

In this example, the private network 108 is a local area network (LAN) environment employing any suitable interface mechanisms and communications technologies including, for example telecommunications in any suitable form (e.g., voice, modem, and the like), Public Switched Telephone Network (PSTNs), Ethernet based Packet Data Networks (PDNs), combinations thereof, and the like. Moreover, private network 108 may be made up of one or more interconnected LANs located in substantially the same geographic location or geographically separated, although network 108 may include other types of networks arranged in other configurations. Moreover, private network 108 may include one or more additional intermediary and/or network infrastructure devices in communication with each other via one or more wired and/or wireless network links, such as switches, routers, modems, or gateways (not shown), and the like, as well as other types of network devices including network storage devices. Further, system 100 includes public network 108', which interconnects and includes public client computers 102' and public servers 104' to the private network 108 by via the at least one traffic management device 106. Moreover, public network 108' may include any publicly accessible network environment, such as the Internet, which includes network components, such as public server 104, that are not directly managed or under direct control by traffic management device 106, yet whose operation may still be influenced in unique, novel and unexpected ways in response to TCP/IP protocol directives strategically purposefully determined and sent from the traffic management device 106 to make the private network 108, and perhaps the public network 108', operate more efficiently, as will be described in greater detail herein. It should be noted, however, that the ensuing descriptions of the various functionalities relating to the private clients 102 and private server 104 are applicable to the public clients 102' and the public servers 104', respectively, and thus the remaining description will simply refer to either one as clients 102 and/or servers 104 unless noted otherwise.

In this example, the server 104 may run a web page server application, such as a streaming media video application. It is to be understood that the server 104 may be hardware or software or may represent a system with multiple servers which may include internal networks. In this example the server 104 may be any version of Microsoft® IIS servers or Apache® servers, although other types of servers may be used. Further, additional servers may be coupled to the system 100 and many different types of applications may be available on servers coupled to the system 100.

The traffic management device 106 may be interposed between the server 104 and the client computers 102 as shown in FIG. 1. The traffic management device 106 may provide connections established between the servers 104 and the requesting client computers 102. From the perspective of the client computers 102, they have directly established a connection in the usual way to the appropriate server 104 and respective server applications. The existence of the proxy connection is entirely transparent to the requesting client computer 102. The implementation of such a proxy may be performed with known address spoofing techniques to assure transparency, although other methods could be used. The traffic management device 106 may provide high availability of IP applications/services running across multiple servers. The traffic management device 106 may distribute requests from the client computers 102 according to business policies, data center conditions and network conditions to ensure availability of the applications running on the server 104. An example of the traffic management device 106 is the BIG-IP® product available from F5 Networks, Inc. of Seattle, Wash., although other traffic management devices could be used.

As will be detailed below, the traffic management device 106 may receive one or more data requests for the server applications running on the server 104 from the client computers 102. The requests may include header data that provide certain identification and routing data from the requesting client computer 102. The traffic management device 106 may route the requests to the server 104 for the requested application. The traffic management device 106 may receive the acknowledgment that the requests have been fulfilled from the requesting client computer 102. The appropriate server application on server 104 may then terminate or cease the transmission of data.

The efficient data transmission of the system 100 may be based on a protocol that allows deterministic acknowledgement signals such as the Transmission Control Protocol (TCP) of the Internet. Deterministic acknowledgment signals acknowledge the data on receipt and may be sent prior to when that the data transmission has completed. The traffic management device 106 may send a preemptive acknowledgment to the server 104 as soon as it is determined that a block of data or entire requested data file is already present either at the traffic management device 106 or at the requesting client computer 102. The traffic management device 106 may then send an acknowledgment signal initiated by itself or the client computer 102 to the server 104 that stops the sending of server data, thus clearing up bandwidth across the system 100.

Figure 2:
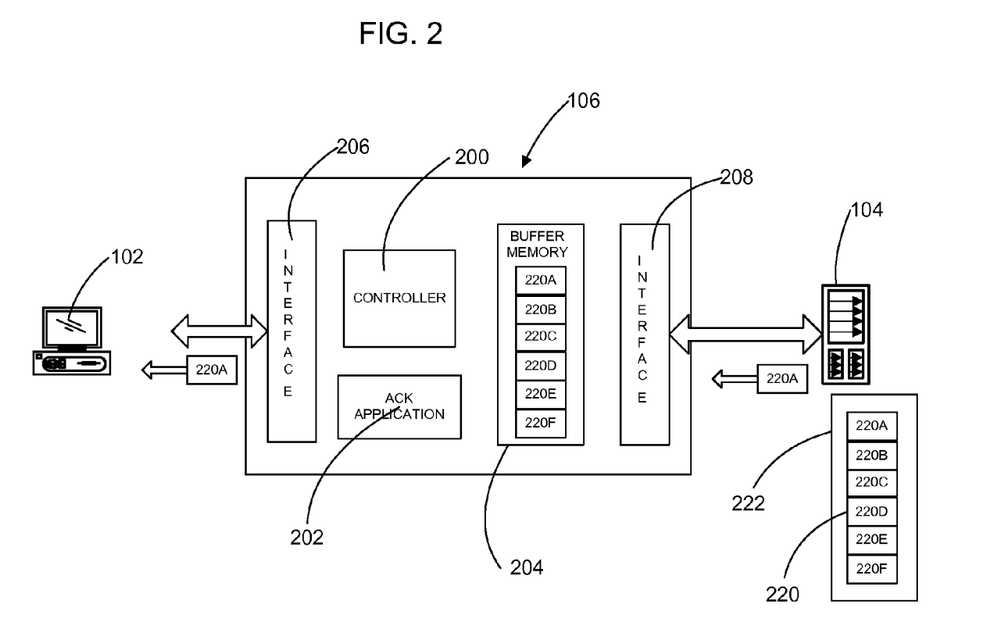
FIG. 2 is a block diagram of the example traffic management device running the network traffic optimization application in the network system in FIG. 1.

FIG. 2 is a block diagram showing the efficient transmission of server data that may use an acknowledge command from the traffic management device 106 or the requesting client computer 102. The traffic management device 106 may include a controller 200 that runs a network traffic optimization application 202. It is to be understood that the network traffic optimization application 202 may be a module of another application such as a local traffic manager application that runs on the traffic management device 106. The network traffic optimization application 202 may also run on the requesting client computer 102 in FIG. 1. The network traffic optimization application 202 may have access to a buffer memory 204. The buffer memory 204 may be used as a cache to hold various data that has been received for transmission to either the server 104 or the requesting client computers 102. The traffic management device 106 may have a client interface 206 that may send responses to and receive requests from client computers such as the client computers 102 through the network 108 in FIG. 1. In this example, the client interface 206 may be an Ethernet connection. The traffic management device 106 may have a server interface 208 that may send requests to and receive responses from connected servers such as the server 104 in FIG. 1.

The traffic management device 106 and the receiving client computer 102 may become aware that requested data is already present in internal memory such as the buffer memory 204 in the traffic management device 106. In FIG. 2, a request may be made via the client computer 102 for a large data file 220 from the server 104. For example, the large data file 220 may be a video file. In response to the request, the server 104 may begin sending the data file 220. In FIG. 2, the data file 220 may be broken into several data blocks 220A-220F which reside in a stack 222 that acts as a send buffer. The data blocks 220A-220F thus may be stored in the stack 222 during the transmission of the data file 220 to the requesting client computer 102. The server 104 may begin to send the data file 220 by sending the first data block 220A from the stack 222 as shown in FIG. 2. Once the server 104 receives an acknowledgment from the client computer 102 or the traffic management device 106 indicating that the entire data file 220 has been received, the server 104 may discard the remaining amount of data file by pushing it out of the internal buffers of the stack 222. The received acknowledgment signal may cause the transmission of the data file to the client computer 102 to end thus freeing up resources such as the stack 222 and bandwidth from the server 104.

In this example, the traffic management device 106 may become aware of the contents of the entire data file 220 by reading an identifying key from the first data block 220A. Such an identifying key may be included in information relating to the requested data contained in the header in the first data block. In this example, the header may include a hash value derived from the data block. The traffic management device 106 may then perform a "pessimistic" lookup of the contents of the buffer 204 while receiving an additional data block 220B. The "pessimistic" lookup is defined as a lookup that is performed without interrupting the underlying operation. Thus, in this example, the lookup is performed while continuing the receiving of the requested data. This comparison may be made using the hash value to determine whether the requested data is already stored. If a match is found, the traffic management device 106 may stop the transmission of the remainder of the data file 220 from the server 104 by sending an acknowledgment signal to the server 104. In this example, the traffic management device 106 may store the data blocks 220A-220F of the data file 220 from a previous request in the buffer 204 and thus the traffic management device 106 may send an acknowledgement signal to the server 104 using the identification of the client computer 102. Since the data already exists, the remainder of the requested data (data blocks 220C-220F) may instead be sent by the traffic management device 106 from the stored data in the buffer 204 and therefore additional data blocks from the server 104 are unnecessary to fulfill the request. If a match were not found, there is no penalty for the subsequent trip time of the additional data (data blocks 220C-220F) from the server 104.

An alternate process may be a network traffic optimization application installed on the client computer 102 in FIG. 1. In the case where the traffic management device 106 is not a part of the system 100, or where the data requested is not in the buffer 204 of the traffic management device 106, the client computer 102 may have access to a cache with the requested data. In such a case, the client computer 102 may send a deterministic acknowledgement signal to the server 104 to terminate the transmission of the data prior to the sending of all of the requested data.

Each of the client computers 102, server 104, and the traffic management device 106 may include a central processing unit (CPU), controller or processor, a memory, and an interface system which are coupled together by a bus or other link, although other numbers and types of each of the components and other configurations and locations for the components can be used. The processors in the client computers 102, server 104 and the traffic management device 106 may execute a program of stored instructions for one or more aspects of the methods and systems as described herein, including for increasing data transmission efficiency, although the processor could execute other types of programmed instructions. The memory may store these programmed instructions for one or more aspects of the methods and systems as described herein, including the method for increasing the transmission efficiency, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the client computers 102, server 104 and traffic management device 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the systems of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 3:
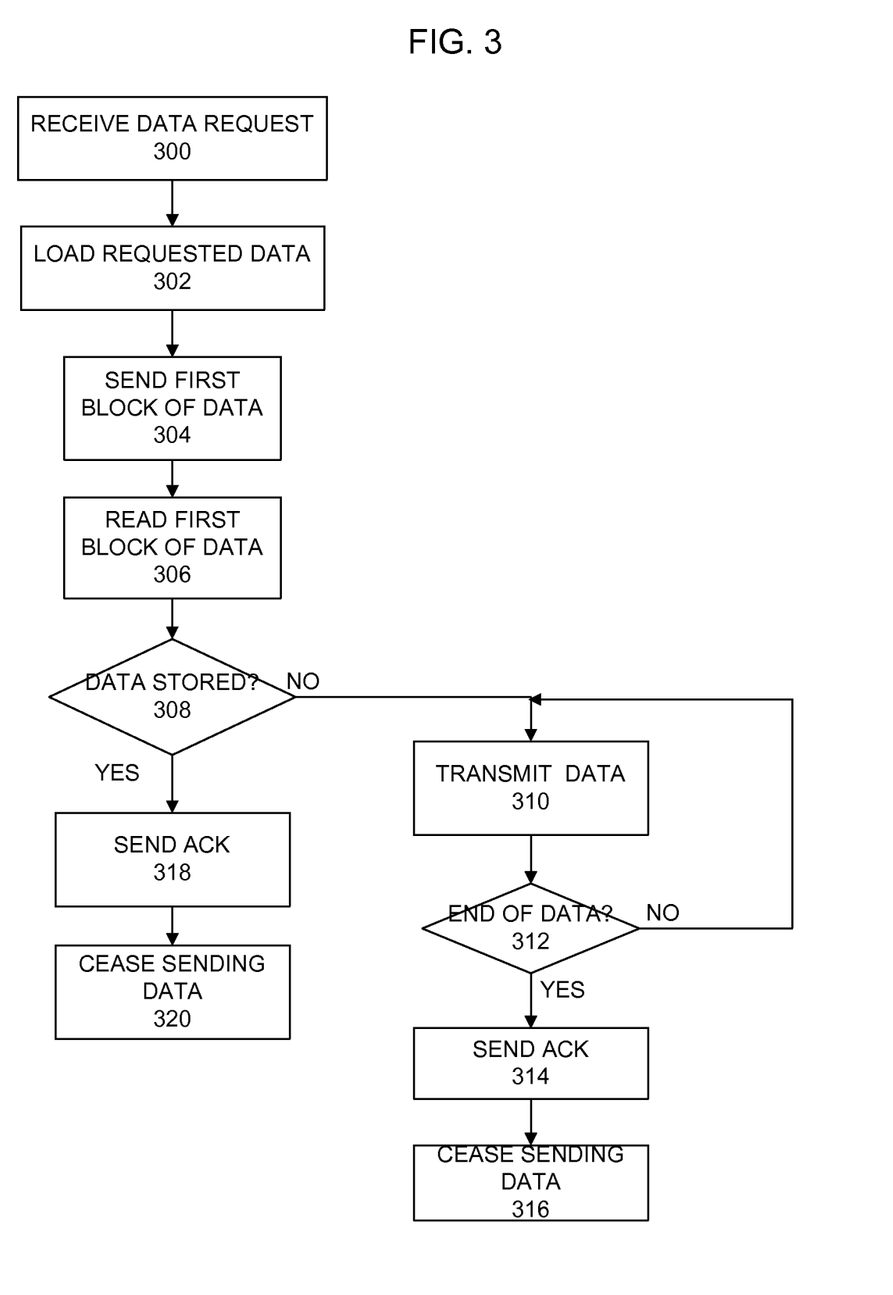
FIG. 3 is a flow chart of methods for data optimization of the data requests performed by the example network system in FIG. 1.

The operation of the example network traffic optimization application 202, shown in FIG. 2, which may be run on the traffic management device 106, will now be described with reference back to FIG. 1 in conjunction with the flow diagram shown in FIG. 3. The flow diagram in FIG. 3 is representative of example machine readable instructions for implementing the data transmission process. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the server 104 could be implemented by software, hardware, and/or firmware. Also, some or all of the machine readable instructions represented by the flowchart of FIG. 3 may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Returning to FIG. 3, a request for server data may be initially received from the client computer 102 by the client interface 206 of the traffic management device 106 via the network 112 in FIG. 1 (300). The network traffic optimization application 202 of the traffic management device 106 may pass along the request for data to the server 104 that locates the requested data (302). The server 104 may place the server data requested in the stack 222 and may begin to send the first responsive block of data (304). The traffic management device 106 may read the header of the first block of data and may begin performing lookups to determine whether the data already is stored (indicating the server data has been previously transmitted to the requesting computer), while sending the first block of data to the client computer 102 (306). The traffic management device 106 may take the information relating to the requested data and, from the lookups, determine whether the requested data blocks exist in the buffer 204 (308). If the requested data blocks do not exist, the traffic management device 106 may continue to allow the transmission of the remainder of the data blocks from the server 104 (310). The receiving client computer 102 may determine whether the next data block received is the last data block (312). If the data block is the last block, the client computer 102 may send an ACK signal to the server 104 (314). The server 104 may empty the stack 222 and cease sending the data blocks on receiving the ACK signal (316).

If the traffic management device 106 determines that the requested data are already stored in the buffer 204 (308), the traffic management device 106 may send a preemptive ACK signal to the server 104 (318). The server 104, on receiving the preemptive ACK signal may cease transmitting any remaining data blocks to the traffic management device 106 (320). The server 104 may then purge the data blocks in the stack 222 thus freeing up the stack 222 for use with other server tasks. Thus, if the data requested exists in the traffic management device 106, greater data transmission efficiency is achieved by sending a deterministic acknowledgment signal to the server 104. For example, the server 104 may proceed to transmit additional responsive data associated with the data file after terminating the transmitting of the responsive data file. In larger data files, the ACK signal may also include information relating to the data blocks in the requesting computer matching the requested data. In such a case, the server 104 could be instructed to transmit only data blocks that are part of the requested data file, but are not available to the requesting computer.

Figure 4:
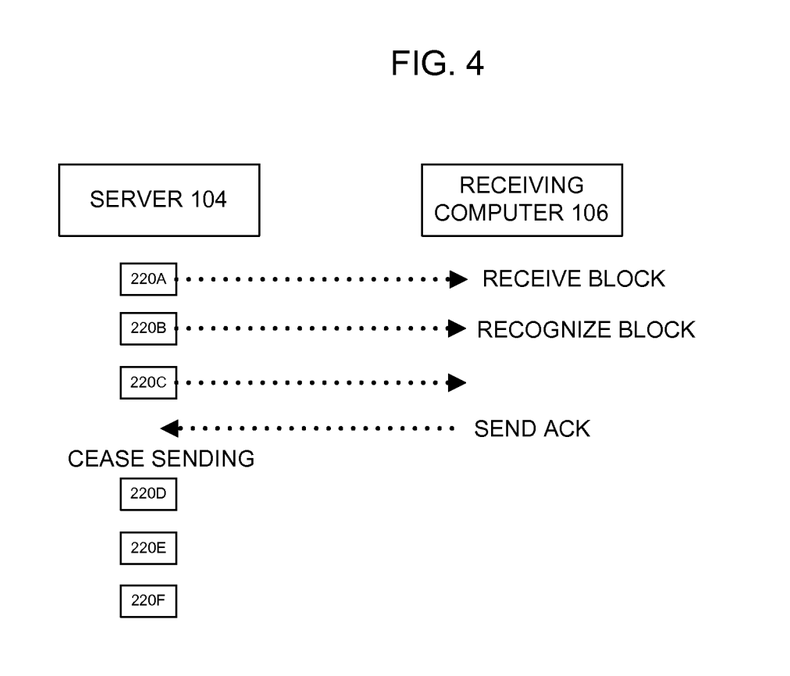
FIG. 4 is a block diagram of the data optimization process shown in FIGS. 2 and 3.

FIG. 4 is a block diagram of a sequence showing a comparison between the use of a deterministic acknowledgement with already cached data and where the data is not cached on the receiving computer. In the example shown in FIG. 4, the buffer 222 contains data blocks 220A-220F described above in conjunction with FIG. 2. The receiving computer (traffic management device 106) may receive the data block 220A. The receiving computer may recognize the data block 220A as part of a stored data file. The receiving computer may then send a deterministic acknowledgment signal back to the server 104 and the server 104 may stop sending the data. In this example, the acknowledgment signal may be received while the server 104 is sending the data block 220C. Thus, the server 104 may devote the stack resources ordinarily devoted to sending data blocks 220D-220F to other tasks.

It is to be understood that the receiving computer that already stores the requested data in the above example is the traffic management device 106 but the receiving computer that already stores the requested data may be the actual client computer 102 in FIG. 1. Thus, the processes described above may also be applied to systems that do not have a traffic management device. Further, although the examples discussed relate to the Internet Protocol, the processes discussed may be implemented with any protocol that offers deterministic acknowledgment signals that allow acknowledgment of data upon receipt and offering the opportunity of an application to identify data prior to its full delivery.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for efficient transmission of data between a requesting computer and a server, the method comprising:
   receiving, at a network traffic management device, a request for server data comprising a plurality of data packets from a requesting computer and sending the request to the server over at least one network;
   receiving a first portion of the server data from the server at the network traffic management device;
   determining, at the network traffic management device, whether a remaining portion of the server data, not yet received at the network traffic management device in response to the request, is stored at the network traffic management device based on the received first portion of the server data;
   sending a preemptive acknowledgement signal from the network traffic management device to the server, subsequent to receiving the first portion of the server data, to cause the server to terminate transmission of the remaining portion of the server data, when the remaining portion of the sever data is determined to be stored at the network traffic management device; and
   sending the remaining portion of the server data stored at the network traffic management device to the requesting computer.

2. The method in claim 1, wherein the determining whether the remaining portion of the server data is stored includes reading a header of one or more of the plurality of data packets of the received first portion of the server data for information associated with the server data.

3. The method of claim 2, wherein the header includes a unique value associated with the server data and wherein the unique value is used in determining whether the remaining portion of the server data is stored.

4. The method in claim 1, wherein the preemptive acknowledgment signal includes information relating to the data packets from the requesting computer matching the requested server data.

5. A non-transitory machine readable medium having stored thereon instructions for increasing data flow in a network, the stored instructions comprising machine executable code, which when executed by at least one processor in a network traffic management device, causes the processor to perform steps comprising
   receiving a request for server data from the requesting computer and sending the request to the server over the network;
   receiving a first portion of the server data from the server;
   determining whether a remaining portion of the server data, not yet received at the network traffic management device in response to the request, is stored at the network traffic management device based on the received first portion of the server data;
   sending a preemptive acknowledgement signal from the network traffic management device to the server, subsequent to receiving the first portion of the server data, to cause the server to terminate transmission of the remaining portion of the server data, when the remaining portion of the sever data is determined to be stored at the network traffic management device; and
   sending the remaining portion of the server data stored at the network traffic management device to the requesting computer.

6. The machine readable medium of claim 5, wherein the determining whether the remaining portion of the server data is stored includes reading a header of one or more of the plurality of data packets of the received first portion of the server data for information associated with the server data.

7. The machine readable medium of claim 6, wherein the header includes a unique value associated with the server data and wherein the unique value is used in determining whether the remaining portion of the server data is stored.

8. The machine readable medium of claim 5, wherein the preemptive acknowledgment signal includes information relating to the data in the requesting computer matching the requested server data.

9. A network traffic management device comprising:
   a network interface configured to receive and transmit data packets between a requesting computer and a server device over a network;
   a memory having stored thereon code embodying machine executable programmable instructions for increasing data flow in the network; and
   a processor configured to execute the stored programming instructions in the memory to perform steps comprising:
      receiving a request for server data from the requesting computer and sending the request to the server over the network;
      receiving a first portion of the server data from the server;
      determining whether a remaining portion of the server data, not yet received at the network traffic management device in response to the request, is stored at the network traffic management device based on the received first portion of the server data;
      sending a preemptive acknowledgement signal from the network traffic management device to the server, subsequent to receiving the first portion of the server data, to cause the server to terminate transmission of the remaining portion of the server data, when the remaining portion of the sever data is determined to be stored at the network traffic management device; and
      sending the remaining portion of the server data stored at the network traffic management device to the requesting computer.

10. The device of claim 9, wherein the determining whether the remaining portion of the server data is stored includes reading a header of one or more of the plurality of data packets of the received first portion of the server data for information associated with the server data.

11. The device of claim 10, wherein the header includes a unique value associated with the server data and wherein the unique value is used in determining whether the remaining portion of the server data is stored.

12. The device of claim 9, wherein the preemptive acknowledgment signal includes information relating to the data in the requesting computer matching the requested server data.

* * * * *